(12) United States Patent
Hill et al.

(10) Patent No.: US 10,320,793 B2
(45) Date of Patent: Jun. 11, 2019

(54) DEVICE, SYSTEM AND METHOD FOR PROVIDING INCENTIVES INCLUDING TECHNOLOGY USE AND TECHNOLOGY-BASED WORK

(71) Applicant: Jail Education Solutions, Inc., Chicago, IL (US)

(72) Inventors: Brian Christopher Hill, Evanston, IL (US); Michael Raymond Dhruba Cornstubble, Fox River Grove, IL (US)

(73) Assignee: JAIL EDUCATION SOLUTIONS, INC, Chicago, IL (US)

( * ) Notice: Subject to any disclaimer, the term of this patent is extended or adjusted under 35 U.S.C. 154(b) by 334 days.

(21) Appl. No.: 15/135,097

(22) Filed: Apr. 21, 2016

(65) Prior Publication Data
US 2016/0315836 A1   Oct. 27, 2016

Related U.S. Application Data

(60) Provisional application No. 62/150,642, filed on Apr. 21, 2015.

(51) Int. Cl.
*H04L 29/06* (2006.01)
*G06Q 30/02* (2012.01)
*G06F 21/00* (2013.01)

(52) U.S. Cl.
CPC .............. *H04L 63/10* (2013.01); *G06F 21/00* (2013.01); *G06Q 30/0207* (2013.01)

(58) Field of Classification Search
CPC ...... H04L 63/10; G06F 21/00; G06Q 30/0207
See application file for complete search history.

(56) References Cited

U.S. PATENT DOCUMENTS

| | | | |
|---|---|---|---|
| 8,222,774 B2 * | 7/2012 | Utz | G11B 33/02 307/328 |
| 9,843,603 B2 * | 12/2017 | Naik | H04L 41/0856 |
| 2002/0038400 A1 * | 3/2002 | Fukushima | G06F 1/1616 710/300 |

(Continued)

*Primary Examiner* — Arvin Eskandarnia
(74) *Attorney, Agent, or Firm* — Klintworth & Rozenblat IP LLP

(57) ABSTRACT

A system and method serve to a user a login menu that is executed on a computing device, wherein the login menu is programmed to acquire from a user a set of parameters for access to a facility computing environment. In response to receiving credentials corresponding to the user, displaying, using the computing device, at least one graphical user interface that allows the user to participate in at least one activity corresponding to the facility, wherein the at least one activity is based in part on the credentials and one or more tasks available at the facility, and wherein the one or more tasks are verified for the user. The system and method generate, using the computing device, one or more points in real-time or near real-time for the user, during execution of the at least one activity at the computing device, wherein the at least one point is based on at least one achievement corresponding to the activity. The system and method generate, using the computing device, at least one reward based on the one or more points, and stores an indication of the achievement in a database communicatively connected to the at least one computing device.

20 Claims, 8 Drawing Sheets

(56) References Cited

U.S. PATENT DOCUMENTS

| | | | |
|---|---|---|---|
| 2004/0260432 A1* | 12/2004 | Jackson | B60R 25/04 |
| | | | 701/1 |
| 2007/0180493 A1* | 8/2007 | Croft | G06F 3/1415 |
| | | | 726/2 |
| 2009/0076823 A1* | 3/2009 | Collins | G10L 15/22 |
| | | | 704/270.1 |
| 2011/0162035 A1* | 6/2011 | King | G06F 1/1632 |
| | | | 726/1 |
| 2015/0186685 A1* | 7/2015 | Vroom | G06F 1/1632 |
| | | | 726/35 |
| 2015/0347412 A1* | 12/2015 | Wolf | G06F 16/335 |
| | | | 707/749 |
| 2016/0189328 A1* | 6/2016 | Vranjes | G06F 3/0488 |
| | | | 345/173 |
| 2018/0137771 A1* | 5/2018 | Wahidy | G09B 7/00 |

* cited by examiner

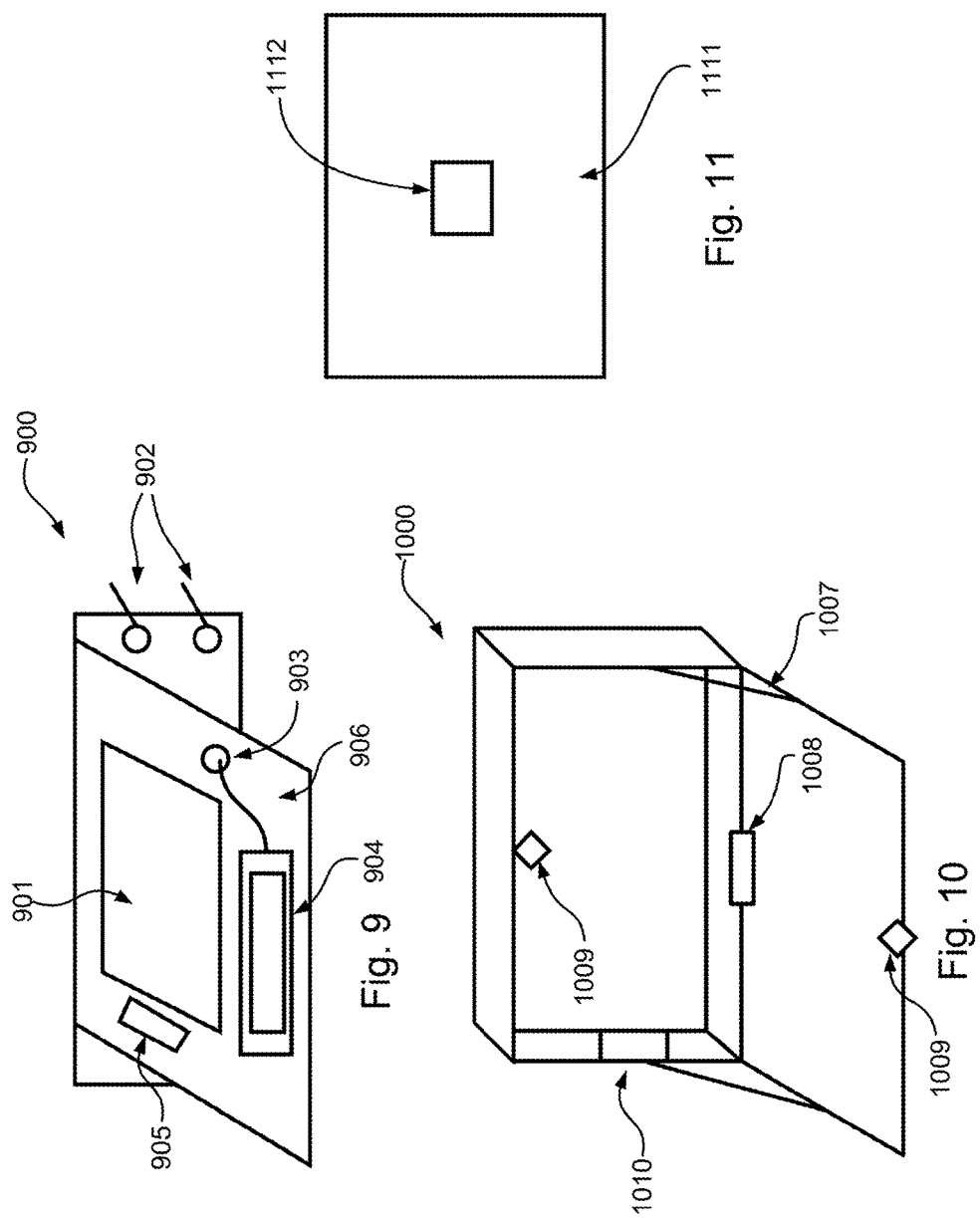

DEVICE, SYSTEM AND METHOD FOR PROVIDING INCENTIVES INCLUDING TECHNOLOGY USE AND TECHNOLOGY-BASED WORK

CROSS-REFERENCE TO RELATED APPLICATIONS

This patent application claims the benefit of U.S. Provisional Patent Application No. 62/150,642, filed on Apr. 21, 2015, the entire contents of which is incorporated by reference in its entirety.

TECHNICAL FIELD

Aspects of the present disclosure relate to distributed systems and platforms, and to the generation of digital incentives for users based on user engagement and participation.

BACKGROUND

The lack of access to educational programming in correctional facilities represents a serious problem in the United States, and is often considered to be one of the primary drivers behind the near 50% average recidivism rate. Furthermore, the lack of access to education-based activities leads to high incidence of violence among incarcerated individuals and between those individuals and correctional officers. Despite consistent evidence illustrating that educational programming reduces recidivism and reduces in-facility violence, correctional facilities face resource constraints when attempting to enable and incentivize large populations of inmates to engage in educational programming. Further, educational programming is typically only offered in distinct areas of a correctional facility and not in the cells, dorms, common areas, or day rooms where residents spend the majority of their time. The vast majority of training is done in-person and does not allow for people to work at their own pace. Additionally, the times and class size of programming and the number of in-person jobs is significantly limited and focused on pedagogy and training with long-term incentives.

It is with these concepts in mind, among others, that various aspects of the present disclosure were conceived.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

FIG. 9 is a perspective view of an example dock for providing access to technical functionality in a correctional or other controlled setting.

FIG. 10 is a perspective view of another example dock.

FIG. 11 is a top view of another example dock.

DETAILED DESCRIPTION

Aspects of the present disclosure provide a web-based, content delivery and learning management platform (referred to herein as the "content management platform"), which includes education-based digital content (movies, music, text, books, surveys, games, videos, audio, pod casts, etc) accessible within the platform, and accompanying online administrative tools and APIs. In various aspects, the content management platform may be accessed by users to engage in a plurality of different incentivized educational based tasks, activities, games, and/or the like, whereby the management system is able to track and monitor a particular user's activities and engagements and automatically award points, badges, etc., for achievement of one or more goals within the various activities, games, and/or tasks.

In one particular embodiment, the content management platform may be delivered through one or more connected devices that enable a TCP/IP network connection, e.g., a personal computer, tablet computers, mobile phone, etc. For example and in one embodiment, the content management platform may be accessed by a correctional facility computing environment through a secure connection, e.g., through a secured packet-switched connection, which securely connects the facilities local network consisting of for example: routing devices; switching devices; servers, wireless access points; and end user devices; and/or the like.

In other aspects, one or more interactive interfaces, graphical-user interfaces, dashboards and/or portals may be generated by the content management platform that enable access to various educational digital content from a remote location, distributed network location, and/or the like.

According to one embodiment, the content management platform may be implemented within, or among, one or more computing components/devices included within a computing environment maintained within a correctional facility or environment, e.g., a jail, prison, juvenile detention center, Immigration and Customs Enforcement detention facilities, adult transitional housing, addiction treatment centers, residential locations including persons on parole or supervised release, etc. Users, e.g., inmates, juveniles, detainees, or other individuals under any type of supervision in a correctional environment may interact with the content management platform to engage in the plurality of different educational based tasks, activities, games, and/or the like.

While the above examples and examples throughout the invention are described within the context of a correctional facility environment, it is contemplated that the technologies described herein may be implemented elsewhere and outside of such environments for ongoing learning and that which the users may keep their account post release.

Figure 1:
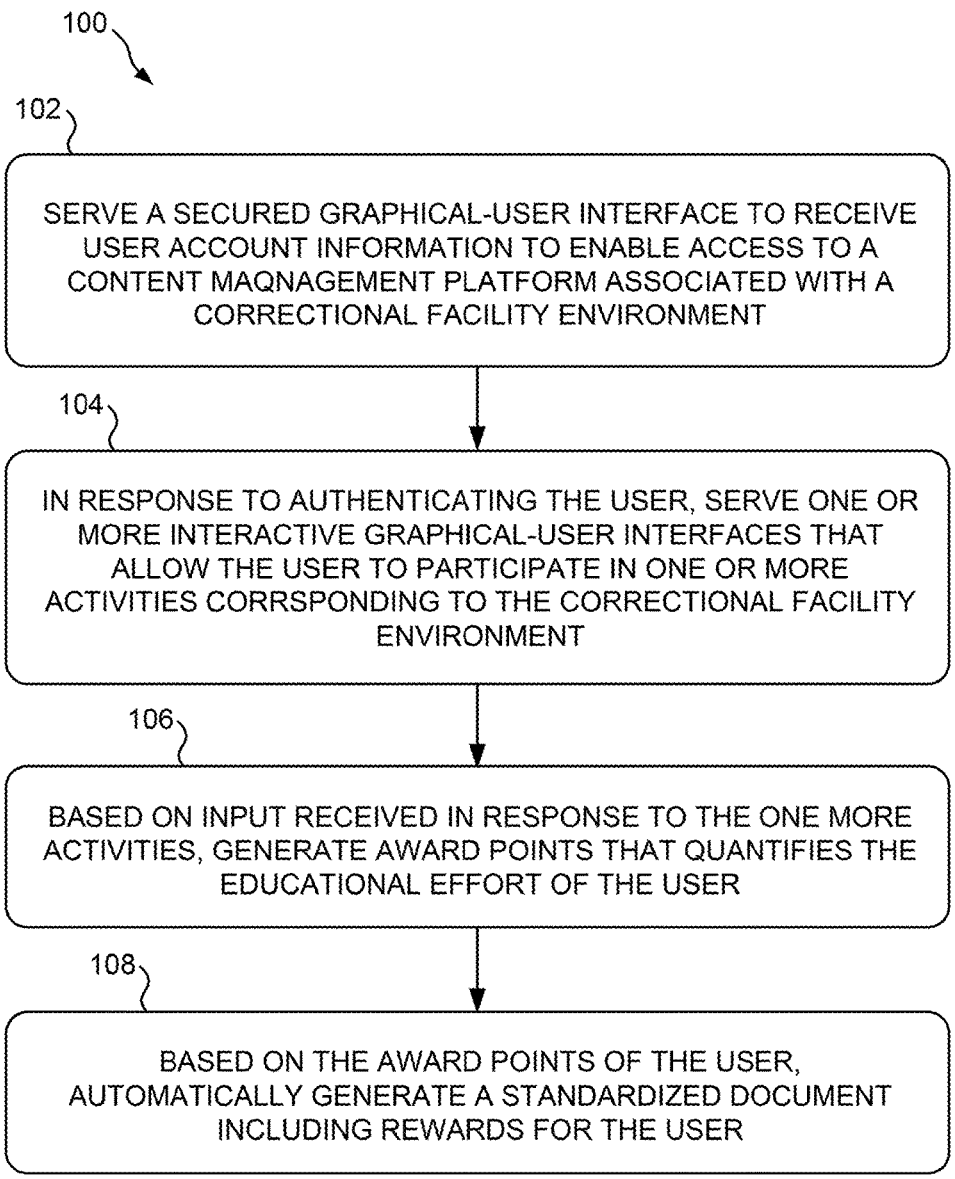
FIG. 1 is a flowchart illustrating an example process for generating a content management platform for a correctional facility environment, according to aspects of the present disclosure.
Figure 2:
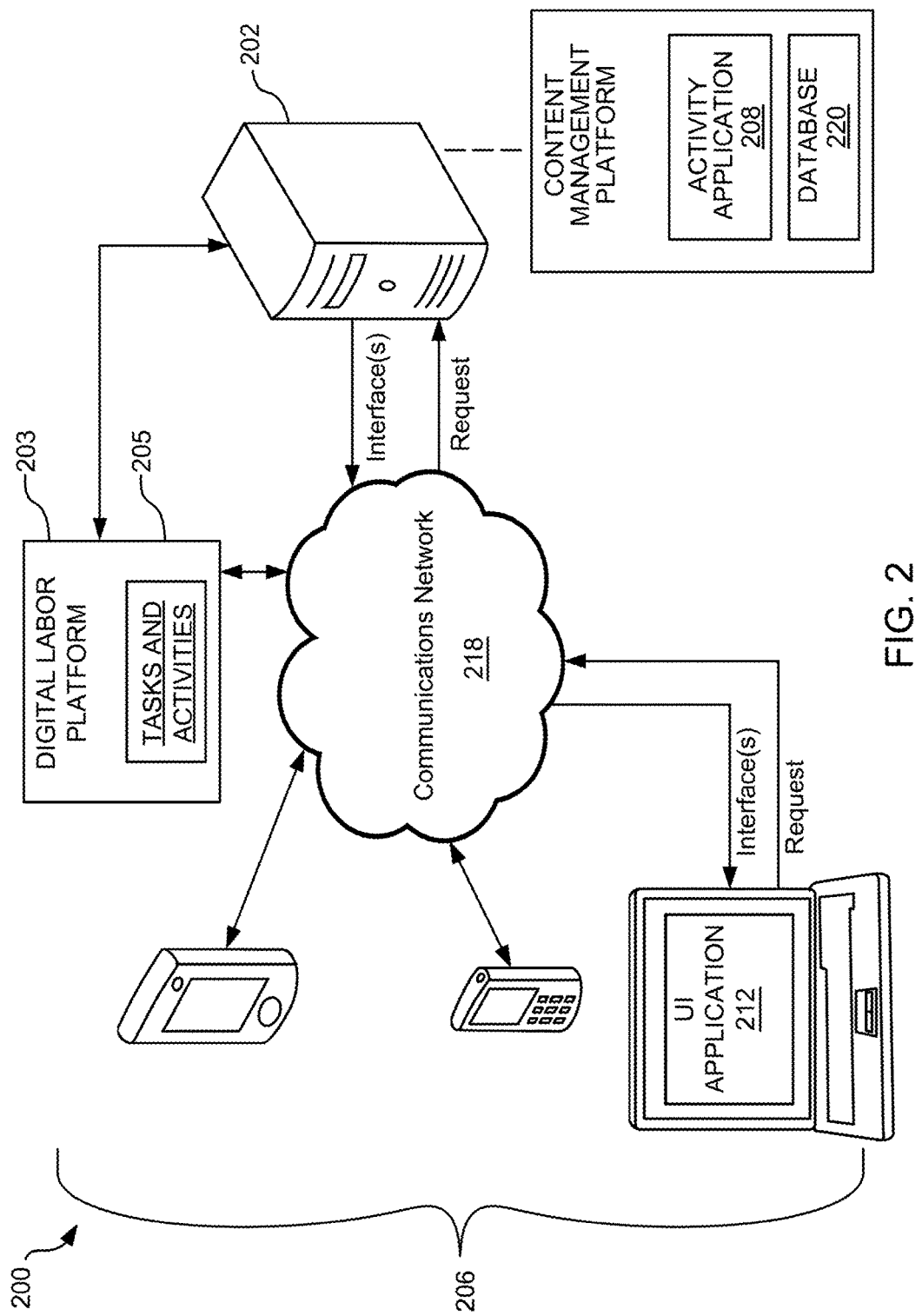
FIG. 2 is block diagram illustrating a computing environment for enabling a content management platform for a correctional facility environment, according to aspects of the present disclosure.

An illustrative process and system for providing a content management platform for access by one or more users associated with a correctional environment, is depicted in FIGS. 1-2. In particular, FIG. 1 illustrates an example process 100 for generating various interfaces (e.g., graphical user-interfaces) that serve and display education-based digital content to users of a correctional facility environment. FIG. 2 illustrates a computing environment 200 associated with a correctional facility environment that includes a content management platform 202 configured to serve and/or otherwise provide the one or more interfaces that enable users to engage in various education-based tasks (e.g., games, activities, tasks, reward generation). More specifically, FIG. 2 illustrates a computing environment 200 including the content management platform 202 operating in conjunction with various other hardware and/or software components may be used to perform or otherwise execute the process 100.

Referring now to FIG. 1, process 100 begins with serving to a user, a secured credentialing graphical-user interface that is programmed to receive user user-account information from a particular user for access to a content management platform associated with the correctional facility environment (operation 102). Additionally or alternatively, the users can also access relevant data to their stay through the interface, including but not limited to release date, court dates, medical information, etc. In FIG. 2 and in one embodiment, a user interested in engaging in various activities, tasks, games, and/or the like at the correctional facility may interact with one or more client device(s) 206 to initiate a request, which may be received by the content management platform 202. More particularly, the one or more client device(s) 206 may also include a user interface ("UI") application 212, e.g., a browser application, to generate the request(s). The one or more client device(s) 206 may be a personal computer, work station, mobile device, mobile phone, tablet device, processor, and/or other processing device capable of implementing and/or executing processes, software, applications, etc. Additionally, the one or more client device(s) 206 may include one or more processors that process software or other machine-readable instructions and may include a memory to store the software or other machine-readable instructions and data. The one or more client device(s) 206 may also include a communication system to communicate with the various components of the content management platform 202 via a wireline and/or wireless communications, e.g., through a network 218, e.g., the Internet, an intranet, an Ethernet network, a wireline network, a wireless network, a mobile communications network, and/or another communication network. The various interactive interfaces generated in response to a monitoring request may be displayed at the one or more client device(s) 206.

Figure 3:
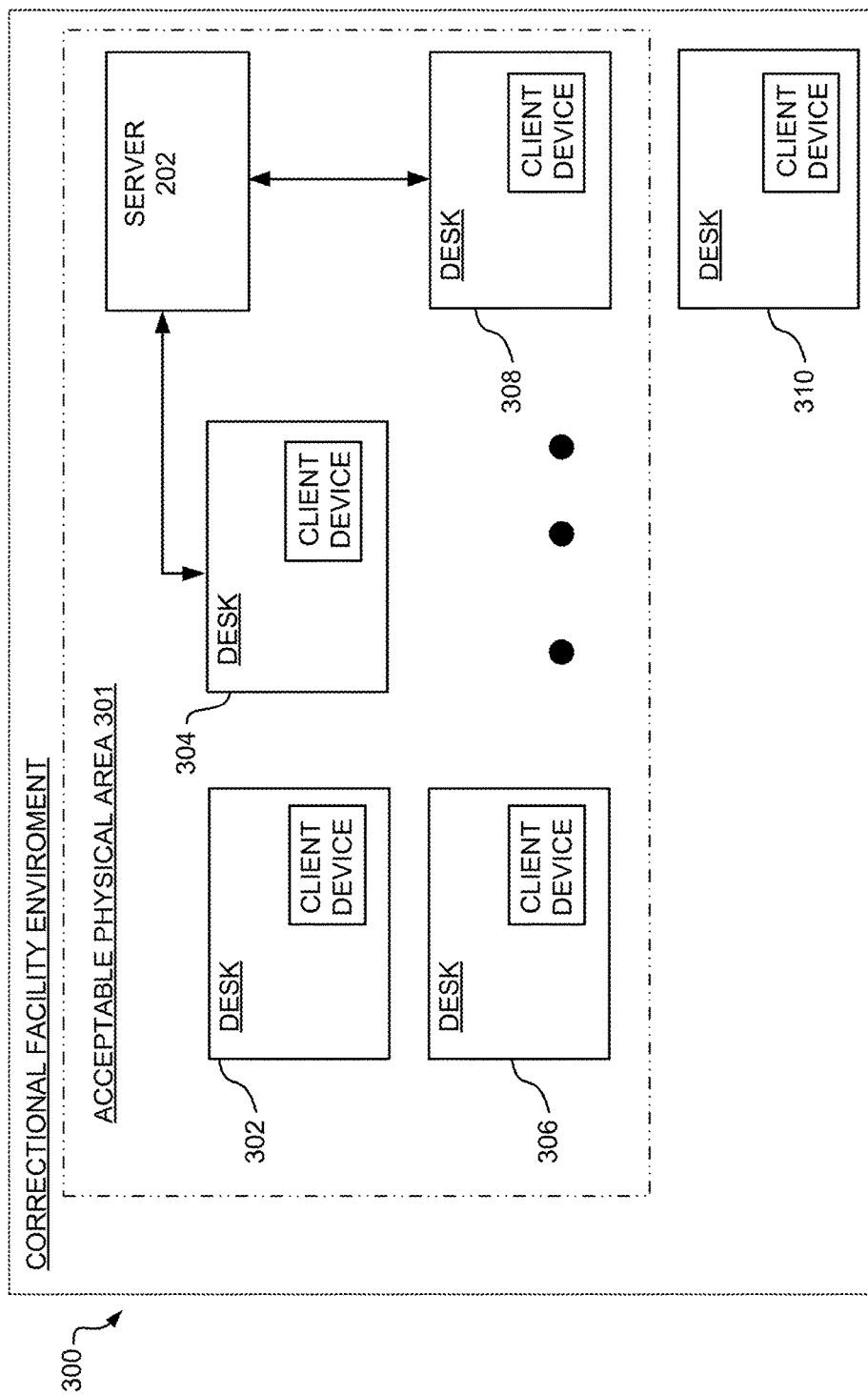
FIG. 3 is another block diagram illustrating a computing environment for enabling a content management platform for a correctional facility environment, according to aspects of the present disclosure.

FIG. 3 provides an illustration of an alternative arrangement of computing devices that may be included within the correctional facility environment 300, according to one embodiment. The illustrated environment includes one or more docking stations 302-312, each containing or otherwise associated with a client device (e.g., a client device 206) and each of which communicate with the content management platform. In one embodiment, the client device of FIG. 3 may be a touchscreen tablet device, handheld device, phone, or limited capacity keyboard device e.g., a notebook. The one or more docking stations 302-312 may be a dock, docking station, kiosk, desk docking station, or the like, and any of which may include a nook, shelf, counter, sill, booth, or cubical.

The content management platform 202 may limit the use of certain device functionality to a specified physical area 301. In another embodiment, the content management platform 202 may: 1) securely limit the range and use of client device cameras, network connections, and other device features to designated areas within a correctional facility environment; 2) expand the functionality and use of the client device by creating a desktop environment with keyboard, stand, and universal serial bus (USB), Bluetooth, Near Field Communication or other connectivity protocols; and 3) enable the activities of users to be controlled, limited, and monitored.

In one particular embodiment, the one or more docking stations 302-312 may be arranged and installed as mini desks that are capable of being mounted to correctional facility environment walls and which enable the client device to rest flat or angled on each respective desk surface. One embodiment may employ a surface cover to limit movement of the client device(s). A mini desk may include: 1) a built in connection to a wired interface, e.g., a USB hub, mini USB, micro USB, or USB enabled accessories like an external QWERTY keyboard, medical devices, cameras, a pointing device, etc.; and 2) a wireless device allowing short range (e.g., five feet or less, ten feet or less, forty feet or less) communication with a computing device through Bluetooth, Near Field Communication or other connectivity protocols.

Once a client device is connected to a mini desk via proper cabling (USB, mini USB, or other), or within the requisite range of the mini desk (in close enough proximity to digitally discover the mini desk through proper signaling means (bluetooth, RFID, NFC, 802.11p, etc.), the client device can securely recognize the device as in a designated location, and the client device, executing in conjunction with the content management platform, can unlock certain built-in features, that are otherwise disabled. Such features may include camera features and functionality or augmented learning and entertainment packages. With these features activated, the dock may be used for secure activities e.g., video conferencing, vocational training, online education, distributed labor (modular digital work tasks accomplished by a pool of workers), and telemedicine. For security reasons, an environment where such activities are accomplished in certain, e.g., monitored, areas of a correctional facility environment.

When a client device is separated from the mini desks designated cabling or moves beyond the requisite signal range of the dock, the device, through MDM software, can again disable the undesirable features like the camera while leaving intact the remaining feature set. Below further explains various configurations and features of a client device, dock, desk (e.g., a mini desk), which is hereby incorporated by reference in its entirety.

Referring again to operation 102 of FIG. 1, in response to any requests received from the one or more client devices 206, the content management platform 202 may transmit instructions that may be processed and/or executed to generate, or otherwise display, the credentialing interface. The server may be a personal computer, work station, server, mobile device, mobile phone, processor, and/or other type of processing device and may include one or more processors that process software or other machine-readable instructions. The content management platform 202 may further include a memory to store the software or other machine-readable instructions and data and a communication system to communicate via a wireline and/or wireless communications, e.g., through the Internet, an intranet, and Ethernet network, a wireline network, a wireless network, and/or another communication network. The content management platform 202 may include or be connected with a database 220, which may be a general repository of data including data, central bank communications data and/or any other data relating to central banks, banks, and generating analytics related to central banks. The database 220 may include memory and one or more processors or processing systems to receive, process, query and transmit communications and store and retrieve such data. In another aspect, the database 220 may be a database server.

Once the credentialing graphical-user interface(s) have been served and access has been authenticated to the requested user based on user-account information, additional interactive interfaces/input forms (e.g. a user-interface or graphical user-interface (GUI)) may be generated that allows the authenticated user to participate in various activities corresponding to the correctional facility that result in the user earning one or more reward points (operation 104). In particular, the content management platform 202 of FIG. 2 may provide a mechanism, process, and/or application, e.g., the activities application 208, which, when executed, generates the interactive interfaces. The interfaces may include interactive elements, e.g., buttons, forms, activity logs, fields, streaming capabilities for streaming games, tasks, and/or activities, selections, inputs, images, etc., charts, for displaying various rewards, and/or activities.

Figure 4:
FIG. 4 illustrates an example screen shot, according to aspects of the present disclosure.

FIG. 4 depict example wire frame, screen shot, and/or blueprint 400 that provide an illustrative guide for the various interface(s) that may be generated by the content management platform 202 that may be used to allow user to engage in various activities, tasks, and/or games at a correctional facility and gain points. Each wire frame illustrates the various kinds of data (e.g., reward analytics) capable of being displayed, the various functionalities capable of being implemented to enable users to engage in activities and/or tasks, and the various effects of different displays on such data.

In one embodiment, to determine what the activities and/or tasks may be included within the graphical user-interfaces and provided to the for display, the activities application may automatically source one or more activities or tasks from a digital labor platform 203 (e.g., CloudFactory, CrowdSource, elance.com, odesk.com), networks, or directly from companies or contractors that are outsourcing the completion of tasks. The activities application 208 ensures that the tasks are appropriate for the correctional environment, and if so, delivers appropriate tasks to appropriate user accounts. In one embodiment, tasks are deemed appropriate based on 1) matching the competency level of the task with that of the user; and 2) the applicable regulations regarding the sharing and use of specific information. Below further explains how tasks and/or activities may be identified for users, which is hereby incorporated by reference in its entirety.

Referring again to FIG. 1, based upon input received at the generated interfaces, the activities application 208 may automatically measure and quantify the educational effort, achievement, and completion (e.g., of a course, lesson, goal, survey, or more) and automatically calculate award points (e.g., digital points, coins, rewards, or other forms of digital currency) for inclusion into the user's personal account (operation 106). More specifically, a user may earn points based on educational effort, achievement, and completion of a course, lesson, goal, surveys displayed within the interactive interfaces. Factors e.g., time spent in the course, speed of completion, completion, accuracy or length of answers to quiz questions, consistency of use, advancement in a subject area, accomplishment of goals, and other factors may all be collected by the correction application, and subsequently processed to calculate the number of points that should be awarded to a user. Additionally, bonus points may be awarded for specific activities that don't fit within categorized calculations as it relates to existing content. The content management platform may allow for new content, quizzes, surveys, goal, badges, etc., to be introduced continuously on the platform and points calculations may be distinct from existing calculations for similar material.

In some embodiments, the interfaces may provide users with information that reveals the number of points he/she has currently earned within his/her account (e.g., tracking points). In yet another embodiment, users may have the option to either exchange any existing points for rewards or engage in activities that can either earn them additional points or allow them to engage with content that neither requires points nor earns additional points. Various additional flow charts and paths for which users may take when logged into the system is described below.

Referring back to FIG. 1, a report, summary, or other standardized format of reward information may be generated based on a particular user's interactions with the one or more interfaces (operation 108). More particularly, the content management platform 202 may process any reward data corresponding to a particular user and subsequently input the reward data into a standardized report structure including some form of master data document populated with corresponding user-account data, game, task, and activity completion statistical data, etc. Example embodiments include an e-mail, Internet-accessible formats e.g., a markup document, pdf, and the like. Any of such documents and/or reports may be transmitted from the content management platform 202 to one or more of the client device(s) 206 for access by users.

In one particular embodiment, automatic reporting of user's accomplishments may be automatically integrated with existing correctional environment management software (software designed for the administrative purpose of tracking and managing the population of the correctional environment) through the use of an application program interface (API) or other automated reporting and used at the facility's discretion to award non digital, sentence-reducing or other rewards for users. Rewards achieved by the user may also be viewable by supporting family members, friends, or other individuals inside and outside the correctional environment as deemed appropriate by the correctional environment's administration.

Figure 5:
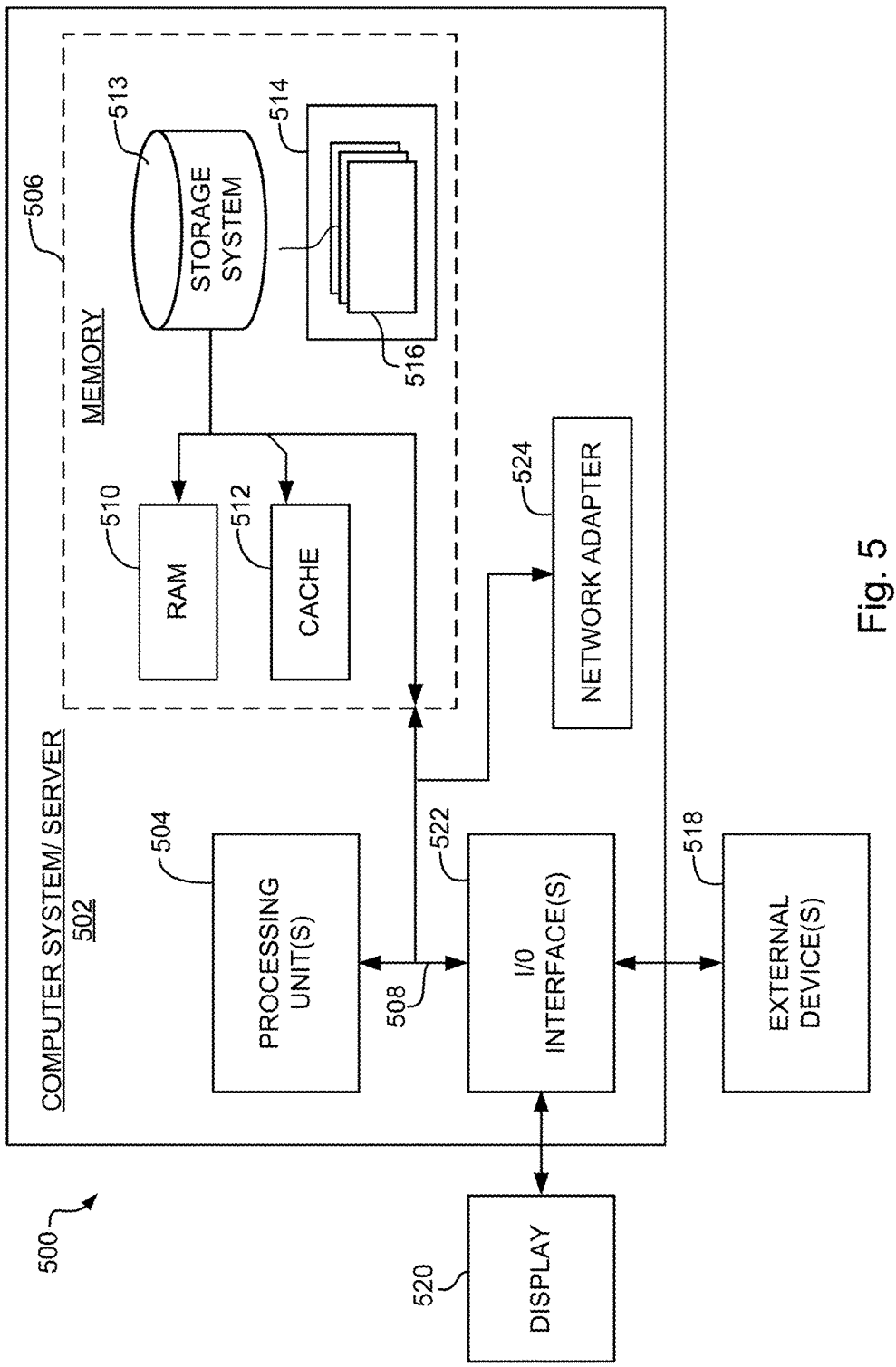
FIG. 5 is a diagram of a computing system, according to aspects of the present disclosure.

FIG. 5 is example schematic diagram of a computing system implementing an analytics system 202 that may be used to generate central bank communication data analytics, according to one embodiment. As shown in FIG. 5, computer system/server 502 in computing node 500 is shown in the form of a computing device. The components of computer system/server 502 may include one or more processors or processing units 504, a system memory 506, and a bus 508 that couples various system components including system memory 506 to processor 504, cameras, HUD(s), sensors, and/or the like.

Bus 508 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 may include computer system readable media in the form of volatile memory, e.g., random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, an optical disk drive for reading from or writing to a removable, non-volatile optical disk e.g., a CD-ROM, DVD-ROM or other optical media may be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

Computer system/server 502 may also communicate with one or more external devices 518 e.g., a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks e.g., a local area network (LAN), a wide area network (WAN), and/or a public network (e.g., the Internet) via network adapter 524. As depicted, network adapter 524 communicates with the other components of computer system/server 502 via bus 508. It should be understood that although not shown, other hardware and/or software components can be used in conjunction with computer system/server 502. Examples, include, but are not limited to: microcode, device drivers, redundant processing units, external disk drive arrays, RAID systems, tape drives, and data archival storage systems, etc.

The embodiments of the present disclosure described herein can be implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

Figure 6:
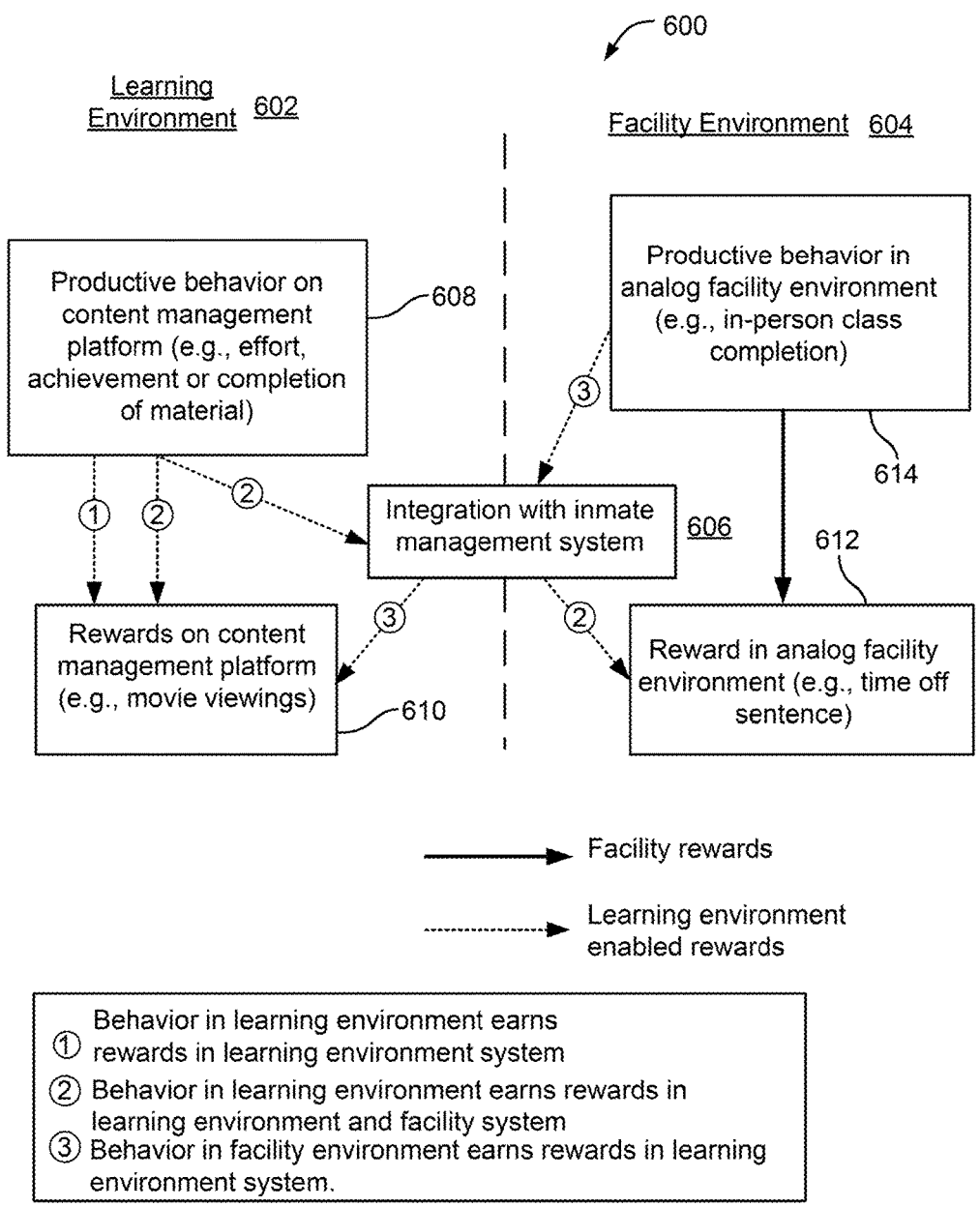
FIG. 6 is a block diagram of an example integration platform.

FIG. 6 is a block diagram of an example integration platform 600. In one example, the integration platform 600 provides for a learning environment 602, a facility environment 604 and an inmate management system 606 to operate together and independently. The environments are used for explanation purposes. In other implementations, the integration platform 600 can integrate more or less types of environments. Productive behavior on the content management platform 202 (608), e.g., effort, achievements and/or completion of material, can earn rewards on the content management platform 202 (610), e.g., movie viewings. Additionally or alternatively, productive behavior on the content management platform 202 (608) can earn rewards in the facility environment 604 (612), e.g., time off the prisoner's sentence or decreased classification level. The inmate management system 606 of the integration platform 600 can also link productive behavior in the analog facility environment (614), e.g., in person class completion) with rewards on the content management platform 202 (610), e.g., movie viewing, more phone time, etc. Non-productive behavior can also be considered.

The integration platform 600 can expand the reach of educational programming available to users, create meaningful, automatically and digitally delivered incentives to engage as many users as possible in productive activity, and make reporting outcomes and awarding additional non-digitally delivered incentives as easy as possible. In this example, the user can include inmates, juveniles, detainees, or other individuals under any type of supervision in a "correctional environment" (including but not limited to jails, prisons, juvenile detention centers, Immigration and Customs Enforcement detention facilities, adult transitional housing, addiction treatment centers, persons on parole or supervised release, etc. The content management platform 202 includes a network-based learning management system, digital content accessible within the system, and accompanying administrative tools and APIs that can be delivered through any connected device that enables a network connection, for example, a personal computer, tablet computers, mobile phone, etc., The content management platform 202 can electronically measure educational effort, achievement, and completion (of a course, lesson, goal, survey, badge, or more) and automatically calculate and award "points" (which includes digital points, coins, rewards, or other forms of digital currency) onto the individuals personal digital learning account (a single user's unique online access or account created with a unique username and password). Course, lesson, goal, or badge completion can also result in earning a certificate or being awarded a badge, both of which are digital files designed to be saved electronically or printed on paper.

The user's accomplishments are automatically reported to the correctional authority through a web based administration digital dashboard (for example, in FIG. 5). Automatic reporting of user's accomplishments integrate with existing correctional environment management software (software designed for the administrative purpose of tracking and managing the population of the correctional environment)

through the use of an application program interface (API) or other automated reporting and used at the facility's discretion to award non digital, sentence-reducing or other rewards for users. Rewards achieved by the user may also be viewable by supporting family members, friends, or other individuals inside and outside the correctional environment as deemed appropriate by the correctional environment's administration.

The points earned by users can be redeemed by the users within the content management platform 202 for multiple types of rewards (including but not limited to music, movies, games, magazines, podcasts, books, pictures, phone minutes, email credits, video visitation minutes, commissary items, short-form internet entertainment content). The points may be redeemed for content management platform rewards as units or tokens (e.g. a single movie, or two songs) or for scalable credits where rewards are provide access to scalable rewards (e.g., 15 minutes to play one game or any series of games, or 20 minutes to make phone calls). For the incentive based learning to be functional at least some of the rewards on the content management platform 202 are only be available in exchange for points. In one example, for the incentive-based learning to be functional at least some of the rewards on the content management platform 202 are only be available in exchange for points.

The rewards can be integrated into an institution's existing library, educational, seminary, independent study, and other programs. For example, content management platform rewards may provide access to library content e.g., magazines, books, videos, or other types of content. Content management platform rewards may also be integrated into an institution's commissary system to allow a user to select clothing, stationery, or comfort items e.g., food or tobacco products. Therefore, the integration platform 600 can expand a reach of educational programming available to users, create meaningful, automatically and digitally delivered incentives to engage as many users as possible in productive activity, and make reporting outcomes and awarding additional non-digitally delivered incentives as easy as possible. Furthermore, the integration platform 600 allows discrete and measured rewards for beneficial behavior to be provided cost-effectively, for example, without action by an administrator.

A lack of access to and engagement with educational programming in correctional facilities is a large problem in the United States, and one of the primary drivers behind the near 50% average recidivism rate. Furthermore, a lack of productive activity can lead to high incidence of violence among incarcerated individuals and between those individuals and correctional officers. Despite evidence that educational programming can reduce recidivism and reduces in-facility violence, facilities face resource constraints in providing, and difficulties in incentivizing, large populations of inmates to engage in educational programming. Further, programming is generally offered in distinct areas of a correctional facility not in the cells, dorms, common areas, or day rooms where residents spend the majority of their time. A majority of training is done in-person and does not allow for people to work at their own pace. Additionally, the times and class size of programming and the number of in-person jobs is significantly limited and focused on pedagogy and training with long-term incentives.

Correctional facilities are increasingly required to implement rehabilitative programming by outside pressure, or local, state, or federal regulation. The integration platform 600 addresses and resolve some of these issues. By having content digitally delivered on an individual basis with little to no instructor interaction needed, the built in incentive structure further serves to draw in learners that can otherwise be uninterested in participating in the statistically beneficial educational, vocational, and treatment programming.

The integration platform 600 can provide web-based content delivery and learning management system, which includes digital content (movies, music, text, books, surveys, games, videos, audio, pod casts, etc.) accessible within the system, and accompanying online administrative tools and APIs. The content management platform 202 can be housed in secure data centers or through hosted cloud service providers, or on-site at a facility. It can be delivered through any connected device that enables a TCP/IP network connection, e.g., a personal computer, tablet computers, mobile phone, etc. In one example, the content management platform 202 is primarily accessed by a correctional environment through a secure connection. For example, this can be a secured packet-switched connection, which securely connects the facilities local network consisting of a routing device, a switching device, a server, all wireless access points and end user devices directly to a data center or cloud hosted virtual private cloud via an encrypted or physically segregated point-to-point mechanism.

In one example, the content management platform 202 is provided by fixed infrastructure at a facility. For example, for ease of use, cost, and security, the content management platform 202 can be delivered to users through the use of tablet computers or wall-mounted computers/kiosks of varying sizes. If users wish to engage with the learning environment 602 and its content to earn rewards they may create a personalized user account. To create an individual account, a user may be required to fill in personal information including name and birthday. They may be also required to select the correctional environment where they are housed as well as their inmate ID or other unique identifying ID as used by their particular correctional environment or in line with the inmate management system used by the correctional environment. They are also asked to create a password and to select security questions to help verify identity and resolve any instances where a password is forgotten.

Additionally or alternatively, the content management platform 202 can be delivered by a web or other network to a user's residence or other location. In this embodiment, the user access the platform by web-based software, or software on the user's personal device, or on a device provided to the user by a correctional institution. The user's device communicates with a central server to track and indicate the user's points, and to permit rewards to be accessed or indicated.

Once a user's account is created, he/she can have access to his/her account where he/she can access a portion of the content management platform 202 that reveals the number of points he/she has on his/her account. This can always be accessed when users are logged in to track points. When users are logged into their personal account, they then have the option to either exchange any existing points for rewards or engage in activities that either earn them additional points or allow them to engage with content that neither requires points nor earns additional points.

In FIG. 6, the integration platform 600 reveals the different path users may take once on logged into their personal account on the content management platform 202. Not all activities earn or cost points on the platform. However, in general activities that are more academically or socially beneficial are those that either earn or do not need to be exchanged for points. Opposite of this, comfort provisions, entertainment based content, and other desirables are deemed rewards. These are primarily, but not necessarily exclusively deemed as rewards and may require an exchange for points. When users have exchanged all of their points for rewards, there is generally provided substantial residual rewards that are not available to users until they earn more points. This is designed to create incentives for users to engage in content that is more academically and socially beneficial or has been statistically proven to reduce recidivism, decrease anti-social behavior, improve societal relations, and other socially beneficial outcomes.

Earning points can be accomplished by users in multiple ways. Primarily points can be rewarded based on educational effort, achievement, and completion of a course, lesson, goal, survey, badge, or other advancement tools. Factors e.g., time spent in the course, speed of completion, completion, accuracy or length of answers to quiz questions, consistency of use, advancement in a subject area, accomplishment of goals, and other factors may all be included in the calculation for awarding users with points. Additionally, bonus points may be awarded for specific activities that don't fit within categorized calculations as it relates to existing content. The content management platform 202 allows for new content, quizzes, surveys, goal, badges, etc., to be introduced continuously on the platform and points calculations may be distinct from existing calculations for similar material. Additionally, the calculation and methodology behind awarding points may be changed over time to adapt to needs of the users, correctional personnel, or administrators.

Points also have the potential to be adaptive to different users. As an example, if users have different risk profiles for substance abuse as determined by a risk assessment, users with a higher risk profile may receive more points for taking a course or engaging with material that is proven to decrease risk for substance abusers, where lower substance abuse risk users may receive fewer points on the same course or material. This dynamic incentive structure can better enable the desired outcome of engagement with the content management platform 202.

Points can be exchanged for various types of rewards. Points are used in a marketplace setup where exchanges/purchases can be made for rewards as individual units, e.g., a movie, a song, a book, an email, etc. The points may be redeemed for scalable or time specific rewards e.g., a 15 minute phone call, 30 minutes of streaming music, or 12 minutes playing a selected game. In a sense, these rewards are unlocked or available for a certain period of time, after which they are locked again and cannot be utilized again until further points are earned. This is tracked through the content management platform 202 that uses a series of methodologies to cap usage based on time or substantiality of use metrics.

The integration platform 600 also provides central tracking of the distribution of points and rewards. The content management platform 202 can include an administrative dashboard (e.g., FIG. 5) that allows for a correctional institution to see the progress of individual users as well as aggregate reports. This can be hosted on a central server, and administrators of the correctional institution to determine who is given privileges to access this dashboard and data. This data allows an institution to track expenditures or provide rewards or punishments system wide or to groups.

An API (application program interface) can also allow progress, accomplishments, certificates, badges, and other types of users engagement with the content management platform 202 to be automatically uploaded into a correctional environment's inmate management systems or other systems used to track resident populations at the correctional environment. This can further minimize the need for the engagement of correctional environment staff in tracking and monitoring or assigning non-digitally delivered rewards to inmates. Where API integration with facility inmate management system is not feasible, the content management platform 202 can make automated reporting (e.g., PDF or Excel reports) or structured data transfer (e.g., .csv or other structured data files) available to facilities to ensure efficient integration into existing operational and technical workflows. This can also allow reporting on non-digital accomplishments of inmates to be reported back to the content management platform 202 so users can receive points that can be used towards rewards for accomplishments, achievements, certificates, awards, good behavior recognition, etc., that occurred outside the content management platform 202. This can include past and future activities as entered into the correctional environment's inmate management system. Thus, a user's accomplishments on the content management platform 202 are pushed to the correctional environment's inmate management system, and the correctional environment's inmate management system pushes a users' tracked accomplishments to the content management platform 202 that are achieved through other mediums.

The integration platform 600 may be configured for use outside correctional institutions, or for use by users who leave an institution providing the platform. For example, once users are no longer residents at a correctional institution, it is possible for the content management platform 202 to convert the users account and profile so that users can continue to use elements of the content management platform 202. This can come in the form of switching to another correctional environment or no longer being housed in and correctional environment. Both an automated online process as well as and over the phone process can be provided to verify that users have officially changed their residential status. Verification is accomplished as each users' account is only allowed to be in use at one instance and in the correctional environment or other facility designated for that user.

Components of the content management platform 202 can include one or more of an algorithm and system for calculating effort, achievement, and completion on that section. An entertainment section, including music, movies, games, etc. An educational section, including academic, vocational, and life skills content. An algorithm for drawing down points while users consume entertainment content. Tablet technology to gather a large amount of data related to goal setting, achievement and interaction. Assessment across multiple areas of content and evaluation: risk, education level, literacy level, job experience, job readiness, career interest, health, family relationship, and other areas. Assessment dynamically recommends a course of study and set of goals for user. Users progress through content pathway based on goal set. An adaptive content management platform 202 dynamically adds in extra practice, content, etc. based on performance. Goal-based platform includes intermittent real-world scenarios/challenges/surveys. Platform "spaces" or "scaffolds" out topic review of previously covered topic to increase retention.

Music rewards can include radio stations, streaming internet radio (e.g., Pandora), on-demand internet music service (e.g., Spotify), or iTunes style music store. Video rewards can include a set of movies and videos available for streaming, a Netflix-style subscription service, or an iTunes store-style rental or purchase. Games can include a set of games available for free, premium games, or games with in-app purchases. Magazines can include individual issues available for purchase, subscriptions to specific magazines, or a subscription (e.g., NextIssue) to multiple magazines. A JavaFX-based "side-loader" that can connect/limit time spent in various applications.

Existing technology (e.g., paper workbooks, textbooks, conventional software in computer labs) does not offer personalized incentives for learning to each inmate based on their own engagement with educational materials. Paper-based offerings do not have the ability to track or react to individual engagements. Conventional software or tablet solutions either 1) involve a firewall that limits access to all entertainment content and therefore cannot provide any incentive; 2) works in an environment of allowed applications on an operating system and cannot control users' access to various portions of the operating system; or 3) does not integrate entertainment rewards with educational engagement into a single application that tracks all activity. Both paper-based and digital solutions occasionally may integrate rewards like time off of sentence, but these rewards come only at the end of months of effort and are not on a real-time, everyday basis. No provider has linked education and entertainment. The attempts to solve the problem of how to reward engagement with education can typically focus on offering badges or certificates to signify achievement. Solutions that provide badges and certificates do not reward a learner on an ongoing, daily basis; they can only reward achievement at the end of a lesson or course of study. Unlike the learning environment 602, previous solutions may not measure both effort and achievement. They typically only measure achievement.

The content management system 202 can issue monetary rewards that the users can use for both digital and analog rewards in the learning environment 602 and the facility environment 604. The content management system 202 can also provide monetary awards for the education based tasks, e.g., described above, and/or distributed labor tasks, e.g., described in FIGS. 7 and 8, that can be used for both digital and analog rewards.

Figure 7:
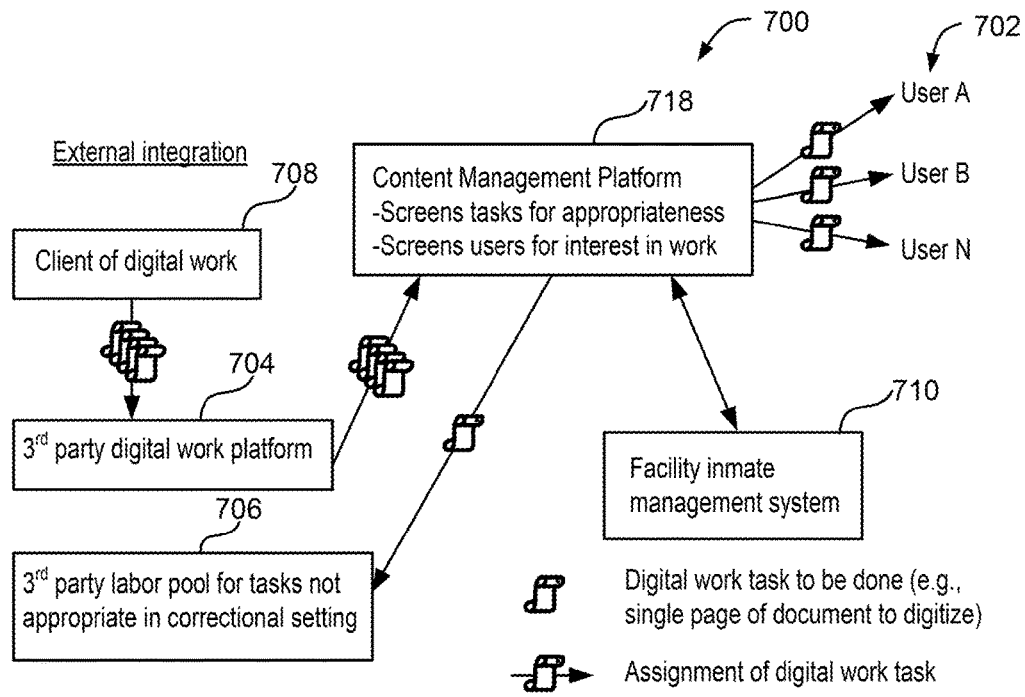
FIG. 7 is a block diagram of an example distribution network of tasks to users, a third party digital work platform and an external labor pool.

FIG. 7 is a block diagram of an example distribution network 700 of tasks to users A-N 702, a third party digital work platform 704 and an external labor pool 706. The content management platform 202 screens tasks for appropriateness (718), e.g., to be handled by the users A-N 702 located in a correctional setting, and screens users A-N 702 for interest in the work. The work can be provided by a client 708 of the digital work. The client 708 connects with the third party digital work platform 704 to provide the tasks needing to be handled. The third party digital work platform 704 communicates the tasks to the content management platform 202 for a determination of appropriateness and an available user A-N 702. The content management platform 202 can route tasks which are not appropriate or which do not have an available user A-N 702 to the third party labor pool 706. Otherwise, the content management platform 202 routes tasks for handling by the user A-N 702.

There is a link between the attainment of education and workforce skills with lower rates of crime and reduced recidivism. However, incarcerated individuals may have very limited access to meaningful education, vocational training and skill-building opportunities, and, there are few obvious and immediate incentives to pursue activities which can deliver those skills, and very limited assessment along the way to help the individual improve and build on what they have learned. Additionally, correctional facilities are increasingly required to implement rehabilitative programming, placing pressure on constrained programming budgets.

In the correctional environment a majority of training is done in-person and does not allow for people to work at their own pace. Additionally, in a correctional environment the times and class size of vocational, job skill, or other educational programming, and the number of in-person jobs, is significantly limited. In many instances these training sessions can be focused on pedagogy and training with long-term incentives but minimal short term benefits. Furthermore, the majority of jobs typically require computer skills or knowledge in one form or another. Present-day vocational opportunities in a correctional setting do not afford most incarcerated learners the opportunity to develop computer skills. Finally, inmates have traditionally been able to participate in many large industries, e.g., manufacturing, call centers, screen printing, housekeeping, food service, etc., but technology and computing enabled work in a secure environment is extremely limited.

The content management platform 202 is designed for use with the correctional environment, including but not limited to jails, prisons, juvenile detention centers, Immigration and Customs Enforcement detention facilities, adult transitional housing, addiction treatment centers, persons on parole or supervised release, etc. The content management platform 202 allows a secure setting for workers, e.g., inmates, juveniles, detainees, or other individuals under any type of supervision in a "correctional environment," to be presented with digital computing device training and work opportunities on a computing device and earn credits, e.g., wages, credits, points, tokens, or other form of compensation monetary or otherwise, based on completion of tasks.

The content management platform 202 sources tasks from digital labor platforms, e.g., CloudFactory, CrowdSource, elance.com, odesk.com, networks, or directly from companies or contractors that are outsourcing the completion of tasks. The content management platform 202 ensures the tasks are appropriate for the correctional environment, and delivers appropriate tasks to workers in a correctional environment. Inappropriate tasks may be re-routed to other laborers outside a correctional environment, e.g. the third party labor pool 706. The content management platform 202 allows workers to complete tasks through a secure network without direct interaction with the World Wide Web or other open networks not directly controlled in the correctional environment. The tasks provide incentives, rewards, and/or learning opportunities to the users. The content management platform 202 gathers the completed tasks and data on the worker and automatically delivers information to the correctional environment's inmate management network 710 about hours worked, tasks completed or started, credits earned, and other data relevant to the worker and the task. Furthermore, the credits earned can be integrated into the inmate management 710 network and exchanged for goods or services.

Figure 8:
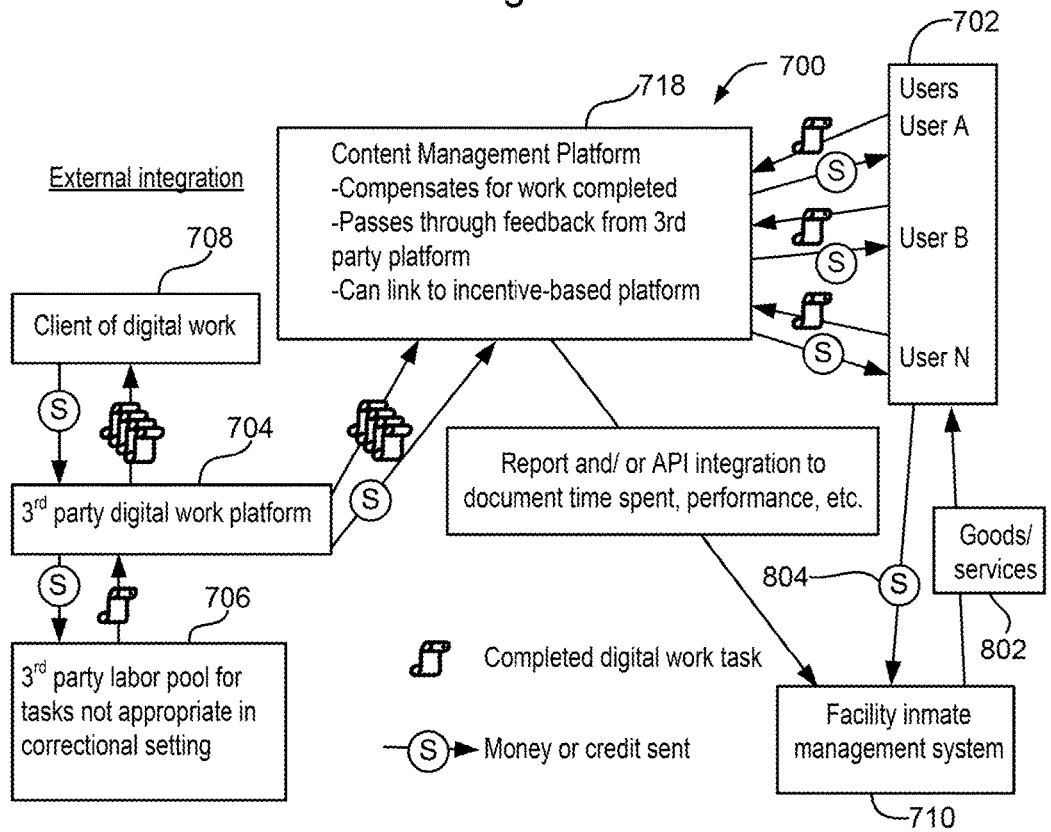
FIG. 8 is a block diagram of the example distribution network for handling the completion of tasks, compensation and reporting.

FIG. 8 is a block diagram of the example distribution network for handling the completion of tasks, compensation and reporting. The content management platform 202 reports to the facility inmate management system 710 and/or the API integration documents the time spent by the users A-N 702, performance, etc. The facility management system 710 can provide goods and/or services 802 to the users A-N 702 in exchange for money and/or credits 804 earned by the user A-N 702, e.g., for completing tasks. The users A-N 702 can use a tablet to work on or complete a task and after doing some portion or all of that task. The users A-N 702 receive credits that automatically transfer and are viewable on both the content management platform 202 and the inmate management network 710. That users A-N 702 can exchange or spend those credits to gain access to aspects of the content management platform 202, or other services delivered through the computing device. They can also exchange or spend those credits for other goods or services offered to workers in the correctional environment otherwise purchased through other means.

The content management platform 202 tracks and generates reporting for users A-N 702 and the correctional environment allowing users A-N 702 to track skills they have started to learn or mastered, and their progress on certain skills. Skill achievements may also be displayed in a resume or CV fashion to benefit workers, after they leave the correctional environment, in obtaining employment or proving skill achievement and progress. Though the content management platform 202 can be accessed on tablets, it is not necessary, and can be used on computer workstations, tablet workstations, or other connected devices. Users A-N 702 can do one or numerous tasks and earn the rewards for either and work for as long or as little as they want. No physical money need be transacted across the content management platform 202. Value can be exchanged digitally, ensuring better security for the facility. Users A-N 702, e.g., inmates, can use the money/value/credits earned on education, entertainment, communication, commissary, or future goods or services in post-incarceration environment. Users A-N 702 can use the money/value/credits earned on the tablet or at the inmate management system. Work can be accomplished with or without a keyboard. Work can be sourced from the third party platform 704 contracts can be sourced directly, or a combination thereof. The work can be accomplished in a dedicated work window or embedded in a video game or entertainment content to assist the use in a correctional setting, e.g., gamified. For example, if the task were to categorize an image into one of four content categories, a game can be created to have the user A-N 702 fire a paintball at the category meant to be hit, with feedback on the user's reaction time and accuracy.

The work platform can include a single sign-on and be tied to the login of the content management platform 202. The types of work or tasks that can be accomplished in this setting include but are not limited to: lead vetting/scrubbing; user interface or user experience testing for new applications or websites; sentiment analysis categorizing online written or visual content into a particular sentiment (e.g., for a brand to know if Tweets about it are positive or negative); surveys from advertisers, non-profits, academics, etc.; performance marketing (activities from advertisers); coding; content moderation; data scrubbing; training machine learning algorithms by providing human input; online content generation; digital transcription services (for audio or video); participation in research studies; translations; focus groups for online content; and others.

FIG. 9 is a perspective view of an example dock 900 for providing access to technical functionality in a correctional or other controlled setting. For purposes of explanation the correctional setting is used. The dock 900 includes a surface cover 901 creating friction to reduce sliding. Bolts, screws, or other fasteners 902 connect the dock 900, e.g., a mini desk, to vertical surface. Wired interface 903, e.g., a USB hub, mini USB, micro USB, or USB enabled accessories 904 like an external QWERTY keyboard, medical devices, cameras, a pointing device, etc. USB, mini USB or other electronic hub 905 allows for more than one accessory to be connected. Wire 906 connects the accessory to a wired interface.

FIG. 10 is a perspective view of another example dock 900. In one example, an enclosure 1000 of the dock 900 includes a metal bar 1007 that limits full hinge 1008 rotation. The hinge 1008 allows a mini desk or dock surface to open and close. Locking mechanism 1009 closes and secures mini desk or dock 900 when closed. Computing device 1010 communicate short range through Bluetooth, Near Field Communication (NFC) or other connectivity protocols.

FIG. 11 is a top view of another example dock 900. When the user brings the computing device to within area 1111 the dock 900 grants the computing device 1112 to operate with determined functionality. The computing device 1112 communicates with the dock 900 via short range through Bluetooth, Near Field Communication or other connectivity protocols. Additionally or alternatively, the computing device 1112 may hardwired to the dock 900.

Referring to FIGS. 9-11, the dock 900 can act as a shelfing apparatus for a tablet or other computing device 1112, including one or more of (1) a high-friction angled ledge, which the tablet leans on and does not slide down, (2) a clasping mechanism that secures the tablet in place, or (3) a lip that the tablet can rest on to lean against the vertical surface of the dock 900. The dock 900 can include a kiosk. A micro-USB wired keyboard that can connect to the tablet. Piping can securely contain the micro-USB wire that runs from the keyboard to the tablet. Screws and fasteners 902 to secure the vertical surface of the kiosk into a variety of surfaces, including concrete, brick, etc. Other components can include a wall-mounted bracket, a rail, notched rail, angled arm to adjust the height of the keyboard and tablet clip-in location for users of different heights and users in different body positions (sitting, standing, leaning) and user heights, a mouse, trackpad, or other pointer device, separate higher-resolution video camera, a wireless keyboard, external medical diagnostic hardware (blood pressure, heart rate, etc.), the addition of more components, including multiple hardware electronic interfaces (e.g., mouse, external video camera, etc.), a microprocessor or microcontroller that controls the interface between the tablet and the multiple external devices connected to it.

The tablet or other computing device 1112 recognizes, based on software and settings and software or settings of the computing device 1112 it is connected to the dock 900, and the operating system of the tablet or other computing device 1112 enables access to device features e.g., video, camera, keyboard and determined programs only when the computing device 1112 is within a determined vicinity of the dock 900. The dock 900 can be designed for use in correctional institutions to provide location-based activation of determined features of the computing device 1112 while allowing other functionality to not be so limited.

The dock 900 limits the use of certain device functionality of the computing device 900 to a specified physical location. The dock 900 can 1) securely limit the range and use of device cameras, network connections, and other device features to designated areas within a correctional institution, 2) expand the functionality and use of the tablet by creating a desktop environment with keyboard, stand and other universal serial bus (USB), Bluetooth, Near Field Communication or other connectivity protocols, 3) provide a low impact, powerless, user agnostic, low cost way to enable digital work, educational activities, health & wellness needs, family engagement, and other inmate activities using technology in a comfortable, more private, individualized manner, and/or 4) provide an environment where the activities of users can be limited and monitored.

In one example, the electronic device 1112 is a touchscreen tablet and the dock 900 is a desk. In other examples the electronic device 1112 is a handheld device, phone, or limited capacity keyboard device e.g., a notebook. In other examples, the dock 900 may include a nook, shelf, counter, sill, kiosk, booth, or cubical. In one example, mini desks can mount to nearly any correctional institution wall and allow for a tablet computing device to rest flat or angled on its surface. The surface 901 cover can limit movement.

Tablets and the dock 900 as a mini desk offer a low-cost solution because the mini desk is powered by the tablet that uses the mobile battery to power the dock and peripherals. A mini desk can include one or both of the following: 1) a built in connection to a wired interface, e.g., a USB hub, mini USB, micro USB, or USB enabled accessories like an external QWERTY keyboard, medical devices, cameras, a pointing device, etc., 2) a wireless device allowing short range (e.g., five feet or less, ten feet or less, forty feet or less) communication with a computing device through Bluetooth, Near Field Communication or other connectivity protocols. In one example, the dock 900 requires no power (see FIG. 9), as all accessories are powered solely by a compatible electronic device connected to the dock. Some docks 900 include a single USB port (see FIG. 10) while others include a hub that allows for more than one accessory to be connected to the computing device (FIG. 9).

Once a computing device 1112 is connected to the dock 900 via proper cabling (USB, mini USB, or other), or within the requisite range of the dock 900 (e.g., the computing device 1112 being in close enough proximity to digitally discover the dock 900 through proper signaling (Bluetooth, RFID, NFC, 802.11p, etc.), the computing device 1112 securely recognizes the device as in a designated location, and the computing device 1112 unlocks certain built-in features, that are otherwise disabled, e.g., through the use of mobile device management (MDM) software. Features may include, but are not limited to, camera features and functionality or augmented learning and entertainment packages. With these features activated, the users can use the dock 900 for secure activities, e.g., video conferencing, vocational training, online education, distributed labor (modular digital work tasks accomplished by a pool of workers), and telemedicine. The dock 900 provides, e.g., for security reasons, an environment where such activities be accomplished in certain, e.g., monitored, areas of the correctional institution.

When a designated computing device 1112 is separated from the dock's 900 designated cabling or moves beyond the requisite signal range of the dock 900, the computing device 1112, through MDM software, can again disable the undesirable features like the camera while leaving intact the remaining feature set. The dock 900 may not require power or Ethernet connectivity. Wireless capabilities of the computing device 1112 and its individualized power source that powers accessory devices can power and connect with the docks 900.

The lives of inmates in correctional facilities can require special measures to create structure and ensure the security of the facility and safety of corrections personnel and the inmate population. At the same time, correctional facilities have an interest in, or may be required by law or regulation, to provide educational, interactive, entertainment, and other functions. A controlled media environment is thus provided by the dock 900 in correctional facilities. For example, for security purposes, videoconferencing/camera access is only allowed in approved areas of correction facilities. In the past, this has not needed enforcement because wall mounted kiosks or separate offices were how video visitation, telemedicine, video arraignment, and other like activities were accomplished. With the rapidly increasing interest in and deployment of handheld electronic devices in correctional institutions, there may be a desire to use the full functionality of the device. Additionally, videoconferencing in correctional institutions is expensive in part because of the cost of installation of equipment, hardwiring a power cable, and the expense of the hardware. This is due to the need for expensive and time-consuming cross-wiring of power to each kiosk. Still, the mobility of a handheld device exposes the jail to greater risk and liability as cameras and video conferencing are no longer tethered to designated kiosk and office areas, but instead can be anywhere wireless reaches. By securely disabling undesirable features when the user is outside designated locations, while allowing features in desired locations, the dock 900 provides a way for the tablet device to functionally operate safely in all areas of a correctional institution.

The systems and methods described above may be implemented in many different ways in many different combinations of hardware, software, firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A system, comprising:
a content management platform having a processor;
a database operatively coupled to the content management platform and accessible by the processor;
a plurality of client computing devices located in a correctional facility and operative to physically connect to and disconnect from corresponding docking stations located in the correctional facility, the client computing devices and corresponding docking stations remotely located from the content management platform;
wherein when each of the client computing devices physically connects to a corresponding docking station, the content management platform securely recognizes the physically connected client computing device and unlocks selected built-in functions of the physically connected client computing device, and displays at least one graphical user interface on a display of the client computing device;
wherein when a physically connected client computer device is separated from the corresponding docking station by greater than a predetermined distance, the content management platform disables at least one of the enabled selected built-in functions;
wherein the graphical user interface allows a user to participate in at least one activity corresponding to the facility, wherein the at least one activity is based in part on credentials of the user and one or more tasks available at the facility, and wherein the one or more tasks are verified for the user;
the client computing device configured to generate one or more points in real-time or near real-time for the user, during execution of the at least one activity at the client computing device, wherein the at least one or more points are based on at least one achievement corresponding to the activity; and
wherein an indication of the achievement of the corresponding client computing device is stored in the database.

2. The system of claim 1, wherein the client computing device rewards on a daily basis before an end of a lesson or course of study.

3. The system of claim 1, wherein the client computing device measures an effort and an achievement of the user.

4. The system of claim 1, wherein the client computing device rewards in a facility analog environment for points earned in a separate learning environment.

5. The system of claim 4, wherein the client computing device rewards in the separate learning environment for behavior in the facility analog environment.

6. The system of claim 1, wherein the built-in functions of the client computing device are activated only when the client computing device is physically connected with the corresponding docking station.

7. The system of claim 1, where the built-in functions include at least one of a video, a camera, a keyboard and a determined program.

8. The system of claim 1, wherein the client computing device processes at least one task of a digital work received from an external source.

9. The system of claim 8, wherein the client computing device reports completion of the task to a facility inmate management system.

10. The system of claim 1, wherein the client computing device generates a monetary reward from the tasks that can be used for both digital and analog rewards.

11. A method, comprising:
operatively coupling a content management platform with a database and providing access between the content management platform and the database;
physically connecting a client computer device to an associated docking station;
serving to a user, a login menu that is executed on a client computing device only when the client computing device is physically connected to the associated docking station, wherein the content management platform securely recognizes the connected client computing device and unlocks selected built-in functions of the physically connected client computing device;
disabling, by the content management platform, at least one of the selected enabled built-in functions when a physically connected client computer device is separated from the corresponding docking station by more than a predetermined distance;
wherein the login menu is programmed to acquire from a user a set of parameters for access to a facility computing environment;
in response to receiving credentials corresponding to the user, displaying, using the computing device, at least one graphical user interface that allows the user to participate in at least one activity corresponding to the facility, wherein the at least one activity is based in part on the credentials and one or more tasks available at the facility, and wherein the one or more tasks are verified for the user;
generating, using the computing device, one or more points in real-time or near real-time for the user, during execution of the at least one activity at the computing device, wherein the at least one point is based on at least one achievement corresponding to the activity;
generating, using the computing device, at least one reward based on the one or more points; and
storing an indication of the achievement in a database communicatively connected to the at least one computing device.

12. The method of claim 11, further comprising rewarding, using the client computing device, on a daily basis before an end of a lesson or course of study.

13. The method of claim 11, further comprising measuring, using the client computing device, an effort and an achievement of the user.

14. The method of claim 11, further comprising rewarding, using the client computing device, in a facility analog environment for points earned in a separate learning environment.

15. The method of claim 14, further comprising rewarding, using the client computing device, in the separate learning environment for behavior in the facility analog environment.

16. The method of claim 11, further comprising activating selected built-in functions of the client computing device only when the client computing device is located within a determined vicinity of a dock.

17. The method of claim 11, where the built-in functions include at least one of a video, a camera, a keyboard and a determined program.

18. The method of claim 11, further comprising processing, using the client computing device, at least one task of a digital work received from an external source.

19. The method of claim 18, further comprising reporting completion of the task to a facility inmate management system.

20. The method of claim 11, wherein the client computing device generates a monetary reward from the tasks that can be used for both digital and analog rewards.

* * * * *